(12) United States Patent
Senn et al.

(10) Patent No.: US 11,181,263 B2
(45) Date of Patent: Nov. 23, 2021

(54) DENTAL LIGHT CURING APPARATUS

(71) Applicant: Ivoclar Vivadent AG, Schaan (LI)

(72) Inventors: Bruno Senn, Gais (CH); Dario Tommasini, Mastrils (CH)

(73) Assignee: Ivoclar Vivadent AG, Schaan (LI)

( * ) Notice: Subject to any disclaimer, the term of this patent is extended or adjusted under 35 U.S.C. 154(b) by 281 days.

(21) Appl. No.: 15/961,062

(22) Filed: Apr. 24, 2018

(65) Prior Publication Data

US 2018/0313529 A1   Nov. 1, 2018

(30) Foreign Application Priority Data

Apr. 26, 2017 (EP) ..................... 17168175

(51) Int. Cl.
| | | |
|---|---|---|
| *F21V 33/00* | (2006.01) | |
| *F21V 3/10* | (2018.01) | |
| *A61C 13/15* | (2006.01) | |
| *F21W 131/202* | (2006.01) | |

(52) U.S. Cl.
CPC ........ *F21V 33/0068* (2013.01); *A61C 19/003* (2013.01); *A61C 19/004* (2013.01); *F21V 3/10* (2018.02); *F21W 2131/202* (2013.01)

(58) Field of Classification Search
CPC ..... A61C 19/003; A61C 19/004; A61C 13/14; F21V 33/0068; F21V 3/10; F21W 2131/202
USPC .......................................................... 433/29
See application file for complete search history.

(56) References Cited

U.S. PATENT DOCUMENTS

| | | | | |
|---|---|---|---|---|
| 8,967,819 B2* | 3/2015 | Jaeger | ................... | A61C 19/004 362/23.05 |
| 2002/0133970 A1* | 9/2002 | Gordon | ................ | A61C 19/004 34/250 |
| 2009/0321413 A1* | 12/2009 | Egenter | .................... | F24C 7/083 219/452.11 |
| 2011/0247158 A1* | 10/2011 | Jungnickel | .......... | G09F 23/0082 15/167.1 |
| 2012/0240434 A1* | 9/2012 | Nezu | ....................... | G09F 13/08 40/541 |

(Continued)

FOREIGN PATENT DOCUMENTS

| | | |
|---|---|---|
| CN | 2622003 Y | 6/2004 |
| DE | 102008027220 A1 | 12/2009 |

(Continued)

*Primary Examiner* — Matthew M Nelson
(74) *Attorney, Agent, or Firm* — Ann M. Knab; Thad McMurray

(57) ABSTRACT

The invention relates to a dental light curing apparatus, having a display device on or at a housing wall of the light curing apparatus, especially on the upper face of the light curing apparatus, having a plurality of light sources, which are arranged below said wall and facing the wall, wherein at least part of the wall is transparent to the light radiation emitted from the light sources, wherein the wall comprises a smooth outer surface, and an equally essentially smooth inner surface of the wall is provided with a negative pattern (18), and especially is printed, leaving the symbols (14) free, which negative pattern (18) is light-impermeable or essentially light-impermeable, and that the wall is superimposed onto the light source structure, which comprises partition walls (32), which separate the light sources (30) from each other.

14 Claims, 2 Drawing Sheets

(56) References Cited

U.S. PATENT DOCUMENTS

2012/0321736 A1* 12/2012 Jaeger .................. A61C 19/004
　　　　　　　　　　　　　　　　　　　　425/155
2018/0313529 A1* 11/2018 Senn .................... A61C 19/004

FOREIGN PATENT DOCUMENTS

| JP | 2002023669 A | 1/2002 |
| JP | 2007322650 A | 12/2007 |
| JP | 2011200451 A | 10/2011 |

* cited by examiner

DENTAL LIGHT CURING APPARATUS

CROSS-REFERENCE TO RELATED APPLICATIONS

This application claims priority to European patent application No. 17168175.2 filed on Apr. 26, 2017, the disclosure of which is incorporated herein by reference in its entirety.

TECHNICAL FIELD

The invention relates to a dental light curing apparatus.

BACKGROUND OF THE INVENTION

Dental light curing apparatuses have long been known as hand-held devices, which comprise a display device on an upper face. The light curing apparatus typically is accommodated in a housing, and the upper housing wall is suitably formed to accommodate the display device.

Basically, two types of display devices are known: On the one hand, such display devices comprise a separate display panel, for example by means of an LCD display. Alternatively, instead of a separate display panel, a display device may also comprise individual luminous elements or may consist thereof. Said luminous elements may for example be realized as LEDs. They may be of different colors, or may also illuminate appropriately formed symbols.

For a safe treatment, dentists require exceptionally bright work place lights. Such work place lights have a luminous intensity of up to 50,000 Lux.

During light curing of dental restoration parts, the light curing apparatus typically is located in the area that is illuminated by the work place light. By this, the recognizability is impeded, and moreover, frequent reflections aggravate unambiguous determination of what the display device actually displays.

On the other hand, the dentist is required to focus on the treatment, so that complicated indications that are not able to be identified at the first glance are ergonomically unfavorable on a LCD display.

Basically, two types of display devices having lighting means are known: On the one hand, display devices are each comprised of separately enclosed and separately cast LED elements, which protrude out of the upper housing wall of the light curing apparatus, and the display thereof is to signalize the appropriate operating state of the dental light curing apparatus. On the other hand, backlit displays are known, which are based on the upper housing wall to be at least partially light-permeable or transparent. A luminous element disposed below that wall is turned on and is for backlighting an appropriately formed symbol, so that it is recognizable.

An advantage of this solution is the smooth surface of the housing wall. It is such a housing wall, which is of importance in dentist offices to enable hygienic working and to avoid dirt getting in corners of the housing.

However, with this solution, under strong light incidence of the work place lights recognizability of the display state of the display device is difficult.

SUMMARY OF THE INVENTION

It is hence the object of the invention to provide a dental light curing apparatus, enabling a backlit display, which, on the one hand, may be produced at comparably low cost, and on the other hand allows recognizability independently of the external lightning state.

According to the invention, this object will be solved by the claims.

One particular advantage surprisingly arises from the fact that the light-permeable housing wall has an essentially smooth surface with a negative pattern. For example, the negative pattern may be a symbol, a numeral, or any short and concise combination of symbols, numerals and letters. Only the negative pattern and the areas of the housing wall covered thereof will be trans-illuminated.

As a result, the contrast surprisingly is especially high in those regions, so that even with strong external light incidence, such as for example at 50,000 Lux, exact identification is possible, whether the respective luminous element of the display device lights up or not.

This will especially be promoted if the areas surrounding the transparent regions are dark, and especially preferable are black.

In regard to the upper housing wall, the light curing apparatus according to the invention may then be produced particularly easily, such that the transparent wall is for example coated by screen-printing with a black layer or with a black lacquer, and is coated on those positions, where the negative pattern surrounds the symbol.

The negative pattern itself is light-impermeable, whereby however it is essential to keep it dark, i.e. for example to keep it black.

It is especially favorable if the housing wall itself is flat, i.e. not having any indentations, and not having any indentations, neither internally nor externally. In this way, it may be produced especially easily. However, according to the invention, it is provided that the light source structure itself, which comprises and bears the sources, have partition walls that separate the light sources from each other. The partition walls preferably have upper end surfaces, onto which the housing wall may abut.

The plane surface thereof is especially suitable to abutingly cooperate with the housing wall also being provided with the negative pattern and being impermeable, thus creating secure confinement of the individual light regions towards each other. Such confinement avoids light to outshine from one light region to another one.

Said upper end face may also be provided with a sealing lip that securely blocks the above mentioned outshine of light. Alternatively, the housing wall may also shortly be adhered onto the end face.

According to the invention, it is especially favorable for the housing wall to consist of a semi-transparent plastic material, which has a significantly higher refractive index than air.

Translucency may be set such that none of the symbols prepared and indicated by a negative pattern will be visible with the light sources turned off.

In the context of this application, by "symbol", besides essential symbols and icons, also any other indications such as numbers and letters are to be understood.

According to the invention, it is also favorable for the semi-transparent housing wall to have a shiny surface area at least in the region of the display elements. In this way, intense incidence of foreign light will at least partially be reflected, and only penetrating to a minor extent.

For example, semi-transparent can be a blend of 50% clear lacquer and 50% colored lacquer, 40% clear lacquer and 60% colored lacquer, or 60% clear lacquer and 40% colored lacquer or any foreseeable combination.

It is thereby avoided that pseudo-indication will be created due to the counter-light and that hence, owing to the reflecting counter-light, an impression of the respective light region as being illuminated by the associated light source will be created.

According to the invention, it is especially favorable for the light region to be free of additional or integrated reflectors. It is thereby assured that any foreign light occurring, irrespective of the measures taken according to the invention, will be absorbed in the light region and will not be reflected.

The under-light region refers to the chamber that surrounds a light source. In an advantageous configuration said chamber, on the bottom face, is limited by a print plate or printed circuit board and an LED chip, and at its side walls is limited by partition walls preventing light from entering into the next adjacent chamber, and at its upper face is limited by the negative pattern and the symbol left therein, which, as the only element surrounding said chamber is transparent.

By the dark configuration of the negative pattern, the backlit symbol clearly is in contrast to the background provided even under unfavorable surrounding light conditions.

The smooth outer surface is preferably free of means that favor reflection. The outer surface preferably may be smooth, thus allowing to ensure the desired asepsis in the dental-technical environment.

The housing wall that is transparent per se may be provided with the negative pattern either at its upper face or its bottom face. The negative pattern may be provided either in the form of lacquer or a coating.

One approach of realizing the negative pattern is application via screen-printing, pad printing, tampography or transfer printing. The negative pattern can be in the form of an opaque paint or lacquer, a foil or a polymer. It can be a material or coating that blocks out light. The surface could be completely coated with a lacquer or paint and the symbols could be formed by a laser. It is preferable that the coating is durable and resistant from wear and chemical influences.

Furthermore, you had asked me to provide an explanation for "negative pattern": The negative pattern can be regarded analog to a photo negative of a symbol which shall be recognizable when illuminated by a back light. This means that the symbol which shall be recognised is left free of any color (i.e., these areas are coated by clear lacquer or by the above-mentioned blend—for semi-transparency) and the surrounding areas are coated with an completely covering material (opaque, not transparent).

In another favorable configuration, the symbols are provided with a white coating. The white coating has some opacity, however, it is formed such that the light source irradiating from the interior may be seen clearly.

In this embodiment, it is especially favorable for the negative pattern to be applied on the exterior, so that it jointlessly transfers to the white coating or the white lacquer in the region of the symbols.

Alternatively, the negative pattern may also be applied inside, on the housing wall, and a whole-area white coating may be applied outside.

BRIEF DESCRIPTION OF THE DRAWINGS

Further advantages, details and features will arise from the following description of a working example of the invention by way of drawings, wherein.

DETAILED DESCRIPTION

Figure 1:
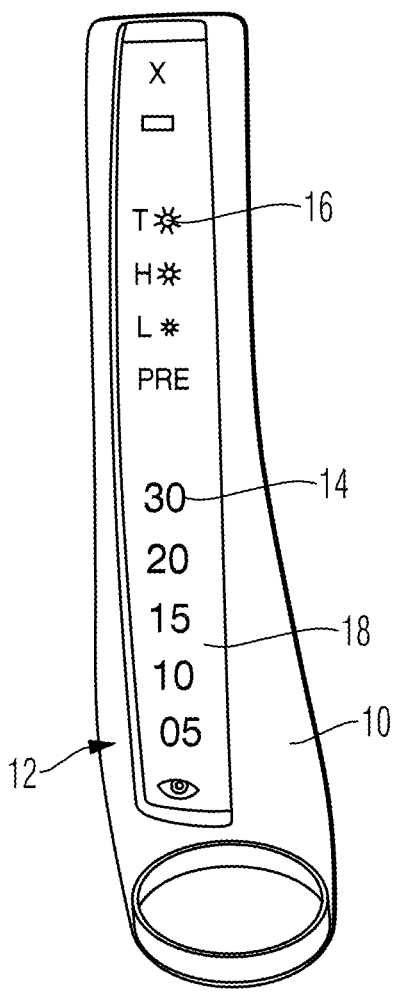
FIG. 1 is a schematic view of an upper wall of an upper housing wall of a light curing apparatus according to the invention in one embodiment.

From FIG. 1 a detail of a light curing apparatus according to the invention may be seen. It is a molding part, forming a housing wall 10 at the upper face of the pin-shaped or pistol-shaped dental light curing apparatus. The dental light curing apparatus is formed as a hand-held apparatus, and besides, comprises further components known per se, i.e. for example a light source, a control unit, a initiating element and a power source, such as an accumulator, as well as a light-guiding rod for applying the light power output to the areas to be treated, for example in the mouth of a patient, or also for light curing parts of prostheses to be repaired.

At the housing wall 10 a display device 12 is formed. The display device 12 has a plurality of symbols 14. Among them, the symbols in the strict sense, such as the sun 16, but also numerals, letters or similar elements, as herein depicted, or any modifications thereof may be understood.

The symbols 14 are backlit. In the turned-off state of the respective symbol, the symbol is not visible. For example, in the bottom/rear region of the display device the symbols "05", "10", "15", "20" and "30" in FIG. 1 may be seen. They are for indicating the operating time in seconds that is to be selected of the light curing apparatus. The respective times may be cyclically controlled via an operating button before the light curing cycle is initiated.

If, for example, the light curing time of "20 seconds" is selected, only the display "20" lights up, whereas the remaining time displays, "30" etc., will not only be non-illuminated, but will not be visible at all. This has the advantage, that the respective cycle time is clearly identifiable by the user.

According to the invention, for this, the housing wall is provided with a negative pattern 18. Said pattern is light-impermeable—or is at least essentially light-impermeable, leaving the regions of the symbols 14 free, so that light may enter the housing wall 10 only therefrom.

Said housing wall itself consist of a transparent plastic, and by applying the negative pattern 18 the symbols 14 will be formed.

The negative pattern 18 may be applied both on the bottom face of the housing wall 10 and on the upper face. By upper face, the exteriorly situated surface of the housing wall 10 is meant. Application onto the bottom side has the advantage that the negative pattern 18 is protected to be scratch resistant.

Figure 2:
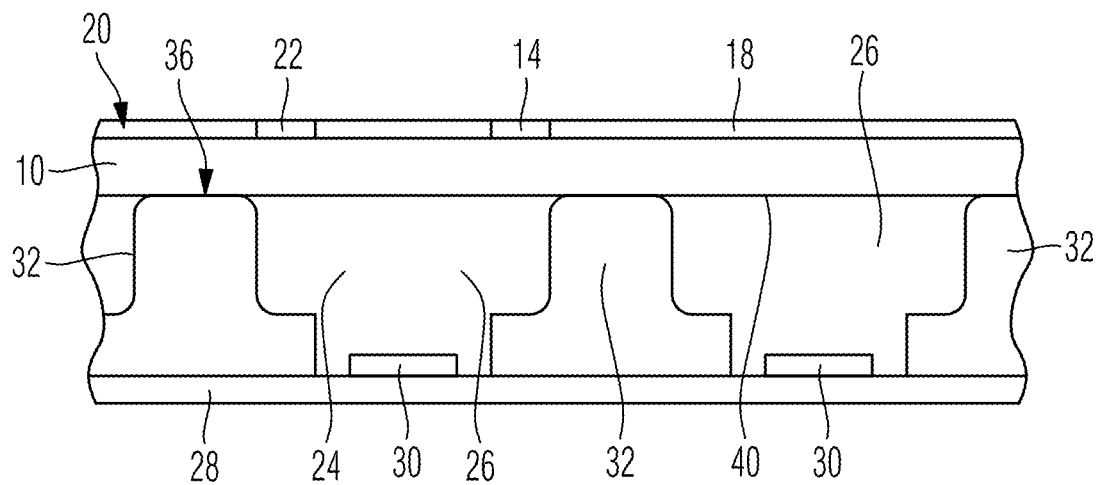
FIG. 2 is a section across a detail of a light curing apparatus according to the invention to represent, among others, the display device.
Figure 4:
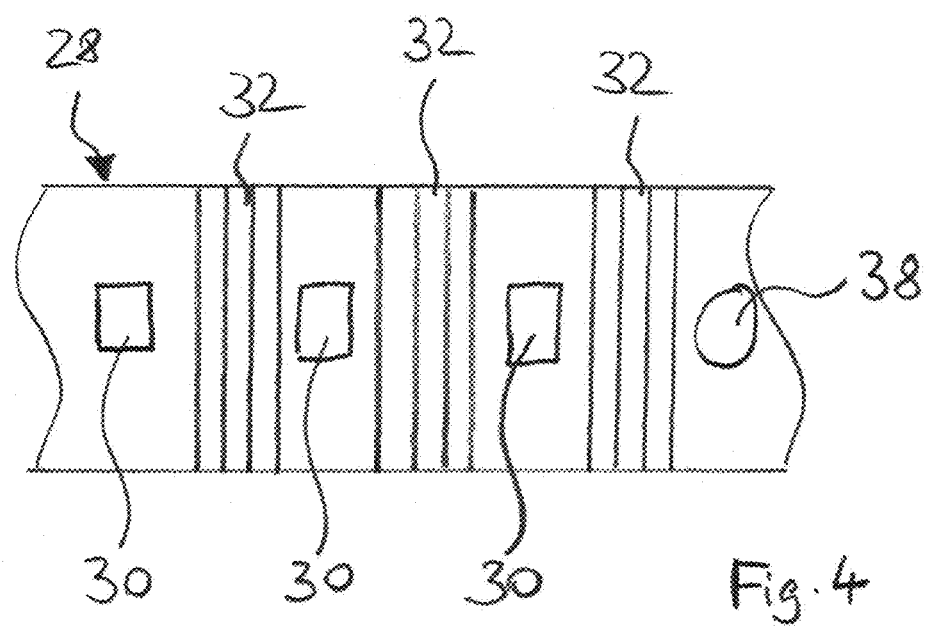
FIG. 4 is a section across a detail of a light curing apparatus according to the invention to represent an arrangement of the lights.

The structure of a display device according to the invention may be seen from FIGS. 2 and 4. Equal reference numbers indicate equal parts. The housing wall 10 is transparent, bearing the negative pattern 18 and the symbols 14 on its upper face 20. Herein, the negative pattern 18 is formed as a black lacquer, which is printed. The areas free of symbols 14 are filled with white top-coat lacquer 2.

In this embodiment, recognizability of the symbols 14 is assured even while the light source is turned off. However, this embodiment is especially safe against foreign light, as entrance of foreign light through the white top-coat lacquer will still further be minimized.

Below each of the symbols 14 a light region 24 is formed. Said light region is realized as a type of a chamber 26. A print plate 28 is formed, onto which the light sources 30 are mounted as LED chips in a manner known per se. The light regions 24 and chambers 26 are separated from each other by partition walls 32. Said partition walls extend between the print plate 28 and the housing wall 10. They may consist, for example, of a light-absorbing black plastic material and may avoid both entrance of light from a chamber 26 into the adjacent chamber 26 and undesired reflection of foreign light.

Each partition wall comprises an upper end face 36. This is for supporting the housing wall 10. Each end face comprises a certain width, which, for example, corresponds to the half, a third, or a quarter of the width of each chamber. In this way, transfer of light from one chamber 26 into an adjacent chamber 26 across the transparent partition wall 10 will further be reduced.

In the working example as set forth, the negative pattern 18 and the symbols 14 are applied on the upper face 20. In this embodiment broad partition walls 32 are desirable.

If, on the other hand, the negative pattern 18 and the symbols 14 are applied on the bottom face 40 of the housing wall (10), it is also possible to operate with smaller partition walls 32, after a light transfer across the transparent housing wall 10 to the adjacent chamber 26 is disabled.

In an especially preferred embodiment it is provided for the white top-coat lacquer 22 to be completely realized on the upper face 20 of the partition wall 10, and the negative pattern 18 and the symbols 14 to be completely realized at the bottom face 40 of the partition wall.

This solution combines the advantages of being applied at the upper face and the bottom face: the symbols are not noticeable at the surface if the respective light source element 30 is turned off. They will arise from the underground upon turning-on, which may be referred to as "Magic Design". The upper face 20 is completely smooth at its surface, which is preferable for hygienic reasons. At least one operating element 38 is included on the printed circuit board 28.

The combination of the wall, light source structure and print plate (28) are at least partially connected to each other, and are bonded to each other, stiffening each other in a frame-like manner and the frame can have a honeycomb structure.

Figure 3:
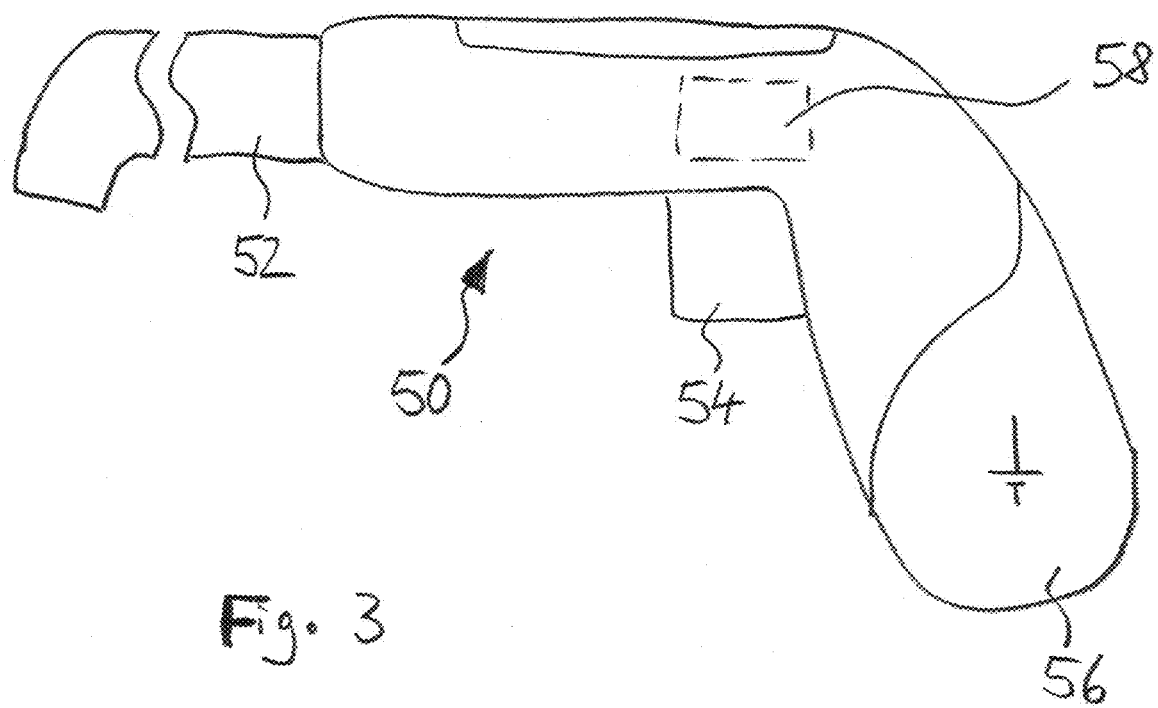
FIG. 3 is a view of a light curing apparatus according to the invention.

FIG. 3 shows a light curing device 50 using the control panel or display device as described and having a light guiding rod (52), an initiating element (54), a power source (56) and a control unit (58).

While various descriptions of the present invention are described above, it should be understood that the various features can be used singly or in any combination thereof. Therefore, this invention is not to be limited to only the specifically preferred embodiments depicted herein.

Further, it should be understood that variations and modifications within the spirit and scope of the invention may occur to those skilled in the art to which the invention pertains. Accordingly, all expedient modifications readily attainable by one versed in the art from the disclosure set forth herein that are within the scope and spirit of the present invention are to be included as further embodiments of the present invention. The scope of the present invention is accordingly defined as set forth in the appended claims.

The invention claimed is:

1. A dental light curing apparatus, comprising
a plurality of light sources,
a display device on or at a one-piece housing wall of the light curing apparatus,
wherein the plurality of light sources are arranged below the wall and are arranged facing the wall,
wherein at least part of the wall is translucent to the light radiation emitted by the light sources,
wherein the wall has a smooth outer surface, and
wherein an inner surface is provided with a negative pattern, which negative pattern provides symbols, which negative pattern is light-impermeable or essentially light-impermeable,
wherein the wall is superimposed onto a light source structure, which light source structure includes partition walls, which separate the light sources from each other, and
wherein the light sources are arranged at a height level in a common plane, and
wherein the wall has a curvature that allows the plurality of the light sources to centrally protrude towards the curvature.

2. The light curing apparatus according to claim 1,
wherein the display device is on an upper face of the light curing apparatus,
wherein the inner surface is essentially smooth, and
wherein the negative pattern is printed.

3. The light curing apparatus according to claim 1,
wherein the wall has a uniform translucency throughout the entire wall, and
wherein the wall is provided with a semi-transparent top-coat lacquer or a semi-transparent cover layer on an upper face.

4. The light curing apparatus according to claim 3,
wherein the negative pattern on the inner surface of the wall is printed or is otherwise applied to the inner surface providing the symbols as transparent regions, or
wherein the negative pattern is disposed on an outer face of the wall and the top-coat lacquer is applied over the negative pattern.

5. The light curing apparatus according to claim 1,
wherein at least part of the symbols is provided with a lacquer or a coating while leaving the negative pattern free from a lacquer or coating, and
wherein the lacquer or coating is a colored lacquer or a colored coating.

6. The light curing apparatus according to claim 1,
wherein the light sources and the negative pattern are spaced apart from each other by a distance, which at least corresponds to half of the size of each symbols, or corresponds to the size of each symbol.

7. The light curing apparatus according to claim 1,
wherein the light sources are arranged on a shared print plate as LED chips at a side of the light source structure, the print plate being opposite to the wall.

8. The light curing apparatus according to claim 7,
wherein the print plate abuts the light source structure, and the light sources projecting into the light source structure.

9. The light curing apparatus according to claim 7,
wherein the combination consisting of the wall, light source structure and the print plate are at least partially connected to each other, and are bonded to each other, stiffening each other in a frame-like manner, the frame having a honeycomb structure.

10. The light curing apparatus according to claim 1,
wherein the light sources are at least partially arranged in a raster, in an array one behind the other, and
wherein the light curing apparatus has at least one operating element that is arranged in an extension of the array, or interrupts the array.

11. The light curing apparatus according to claim 1,
wherein the one-piece housing wall contacts the light source structure at the partition walls and abuts the partition walls.

12. The light curing apparatus according to claim 11,
wherein at least two partition walls are provided, terminating at end surfaces, wherein the end surfaces of a plurality of adjacent wall are formed to be at same height level and are covered by the one-piece housing wall.

13. The light curing apparatus according to claim 1,
wherein the light source structure comprises a print plate, on which both the partition walls and the light sources are applied.

14. The light curing apparatus according to claim 1,
wherein a light region is surrounded by partition walls, the one-piece housing wall, and a print plate, and is free of reflector elements.

\* \* \* \* \*